(No Model.) 2 Sheets—Sheet 2.

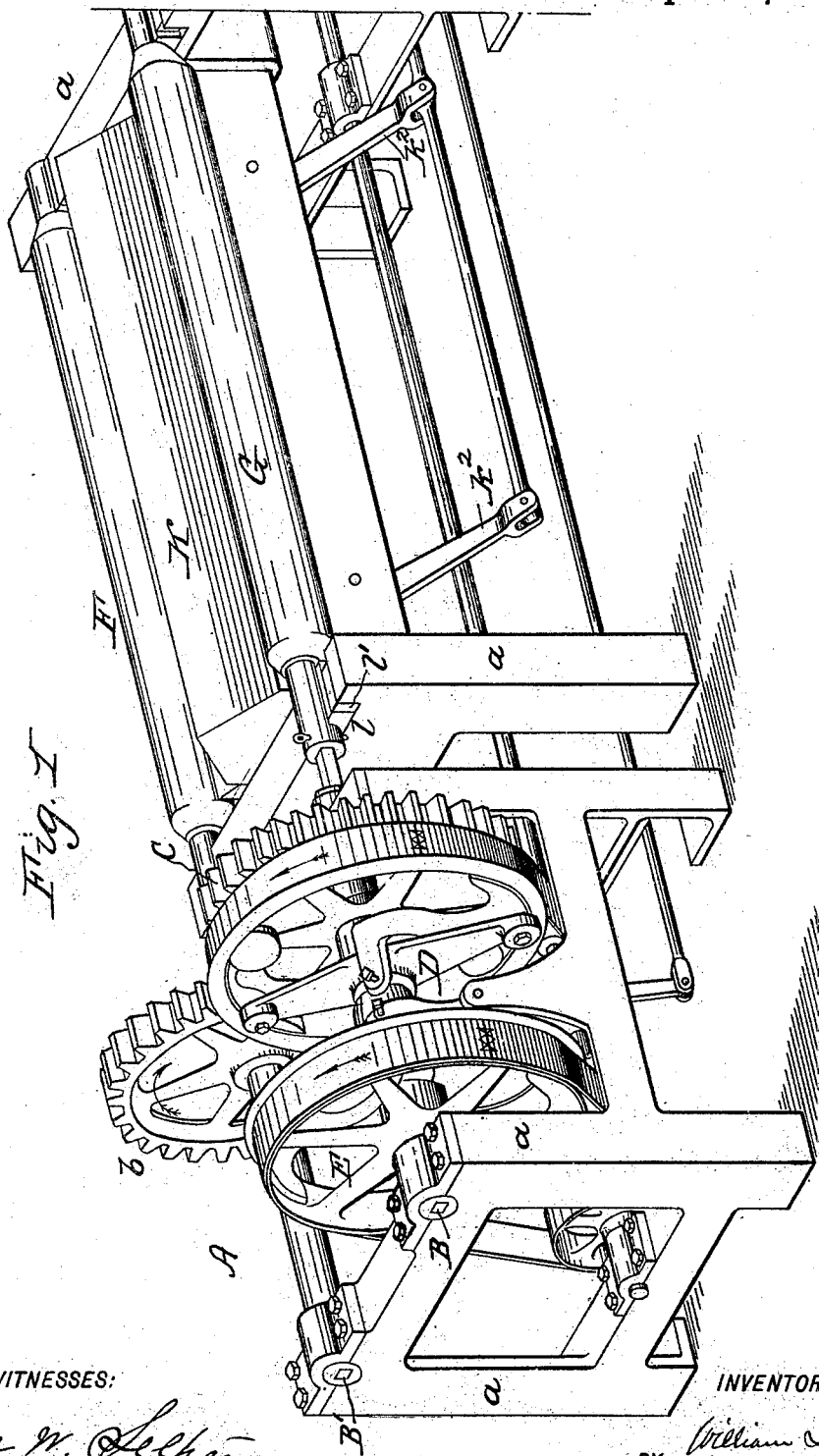

W. IRETON.
MACHINE FOR MAKING CORES.

No. 505,466. Patented Sept. 26, 1893.

WITNESSES:
George W. Seltzer
Augustus H. Beckmann

INVENTOR
William Ireton
BY
Allen H. Gangewer
ATTORNEY.

UNITED STATES PATENT OFFICE.

WILLIAM IRETON, OF CAMDEN, NEW JERSEY.

MACHINE FOR MAKING CORES.

SPECIFICATION forming part of Letters Patent No. 505,466, dated September 26, 1893.

Application filed February 11, 1893. Serial No. 461,980. (No model.)

*To all whom it may concern:*

Be it known that I, WILLIAM IRETON, a citizen of the United States, residing at Camden, in the county of Camden and State of New Jersey, have invented certain new and useful Improvements in Machines for Making Cores; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to making cores, particularly cylindrical cores for insertion in molds or other devices for casting pipe therein; and it has for its object an economical and effective mode of simultaneously forming or making two or more cores instead of one at a time as heretofore has been the case.

In making cores a spindle is wound with a hay or straw band coated or covered with mud, clay, or other suitable material. The spindle is made to run upon a notched trestle or other suitable bearing upon which a loam board or strike, rests, parallel to the axis of the spindle. The coating material is heaped upon the loam board or strike and is pushed against the core body by hand and the core body is revolved by a winch handle in impingement with the coating, until it is covered with it. Each core has to be handled separately and a great deal of time is consumed in placing it in position, in revolving and in removing one at a time, and all surplus material on the strike after the core is coated must be pushed back from the core by hand. In my improved mode of making the cores I obviate these objections.

My invention accordingly consists of the mode of making cores and the combinations, constructions and arrangement of parts as hereinafter more particularly described in the specification and pointed out in the claims.

Reference is had to the accompanying drawings wherein—

Figure 3:
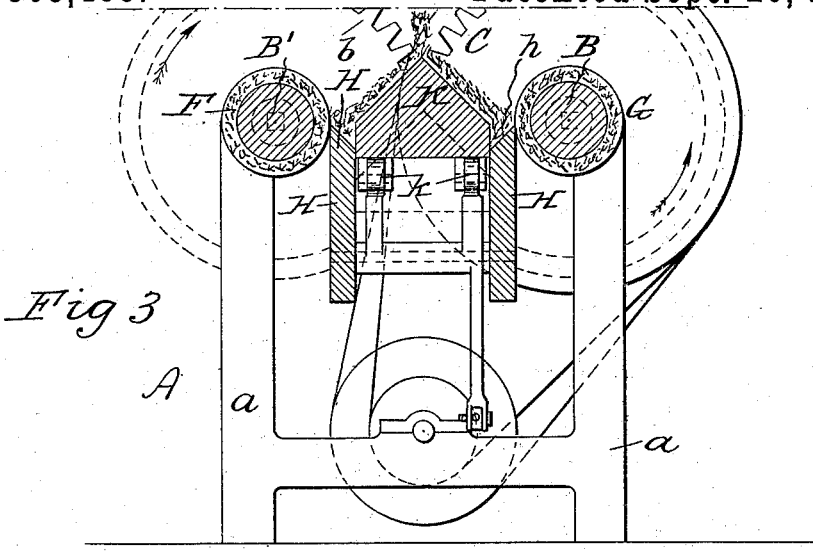
Figure 2:
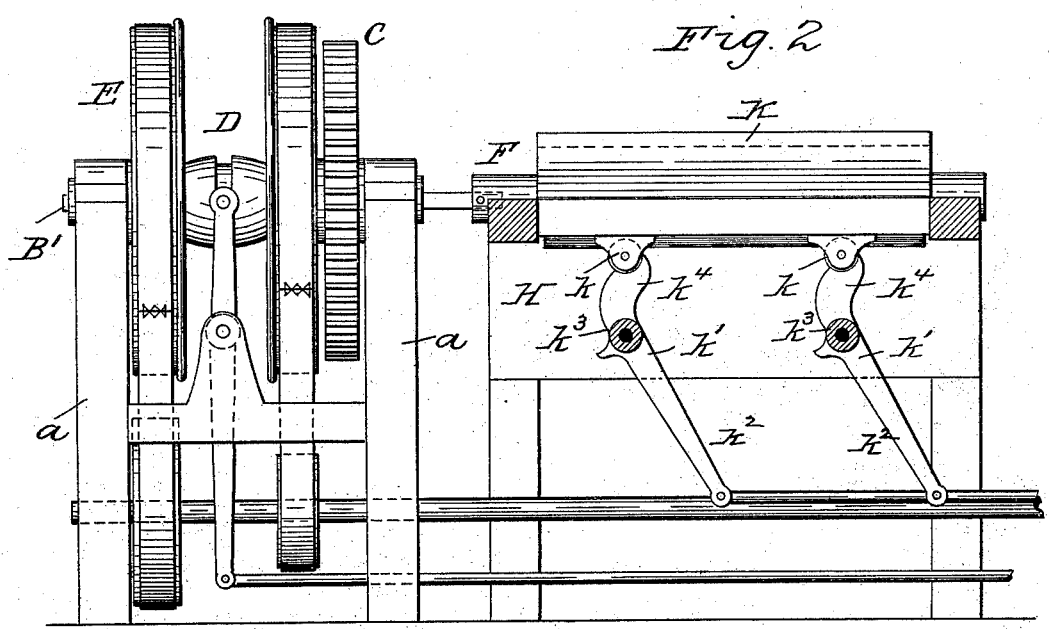

Figure 1 is a perspective view of the same. Fig. 2 is an end elevation partly sectional and Fig. 3 is a transverse sectional elevation of a core forming device embodying my improvements.

A represents my improved core making machine comprising a suitable frame or housing $a$ with bearings, two separated parallel power shafts B, B′, having meshing gear wheels $b$ and $c$ respectively, a coupling device D and a driving pulley E on one of said shafts for rotating them in the direction of the arrows in Fig. 1. The coupling device D may be splined or otherwise suitably mounted on driving shaft B so as to slide thereon as is usual; the pulley E being loose on said shaft and the gears $b$ and $c$ rigidly secured to their respective shafts B′ and B.

F and G are the spindles or core barrels with straw or other material thereon for the bodies of the cores and are connected at one end with the coupling D and have at the other end suitable bearings on the housing $a$. Between the two spindles I interpose two strikes holding them in position in any desired manner, or a feed table having each side beveled thus forming two strikes, one on each side of the table, so as to be arranged vertically between the core barrels F and G and hold the table in position preferably by legs or standards.

The core barrels or spindles suitably covered are placed in impingement to the separate strikes or beveled edges of the table forming strikes and parallel thereto, and the coating material is supplied to the strikes or table and pushed against the revolving core barrels or spindles to coat them as they revolve. When the core barrels or spindles are fully coated they are preferably withdrawn laterally from the strike by means of a slide, or any suitable mechanism, to be replaced by others. When the latter are placed in the machine the core barrels or spindles are again moved up to the strikes and the same operation is repeated.

Instead of locating the striker or strike horizontally relatively to the core barrel or spindle to be coated and pushing the coating material along the strike against the spindle while the latter is revolving in impingement with the coating and thus covering itself with the coating, in my improved method of making the cores I can locate the strikes vertically between the core barrels, and such position of the strikes admits of a feed board or device for two parallel or adjacent strikes, said feed board or device being interposed between the strikes, and being movable up and down so as to withdraw the surplus material from the strikes when the cores are finished and for raising such material to the strike when the successive cores are formed. Arranged vertically between the core barrels F, G are located strikes H one for each core body, and between the strikes H H is interposed an inverted V shaped or other suitably configured block or feed table K, which is preferably held in position between the strikes so as to be movable up and down.

In the drawings the table K is shown provided on its under side with rollers $k$ which are in impingement with and actuated by cams $k^4$ on the upper ends or arms of levers $k'$ having operating handles or treadles $k^2$ and pivoted at $k^3$ to the strikes H, or other suitable part of the machine as desired. When raised to the position shown in full lines of Fig. 1, the bottoms of the inclines of the table or feed device K, are adjacent to the bevel edge $h$ of the strikes so that coating material supplied to the table K, is divided, one part being fed to one strike and the other part to the other strike to coat the revolving core barrels or spindles. When the latter are fully coated the table or feed device K, is lowered as indicated by dotted lines Fig. 3, and carries with it the surplus coating material. The finished cores are then removed from the machine for replacement by other core barrels or spindles to be coated. When the latter are inserted into the machine, the feed device K, with surplus coating material thereon is raised and the operation is resumed for coating the core-bodies as described. It will be noted, that as the parallel core barrels or spindles have the strikes arranged vertically between them, ample space is provided for interposing the feed-devices K, between the strikes, so that when the device K, is lowered the strikes form sides for maintaining the surplus coating material on the device K; further that as the cores revolve in opposite directions or toward the strikes both bodies are coated at one and the same time, and no handling of the surplus coating material is necessary.

What I claim is—

1. The combination of two meshing or connected spindles or core body shafts, and intervening strikes for each core body shaft, substantially as set forth.

2. In a core forming machine, the combination of two rotating core holding and forming shafts, an intervening supply support or table, and vertically arranged strikes between the shafts and table, substantially as set forth.

3. In a core forming machine, the combination of a number of parallel rotating core holding and forming shafts, strikes intermediate of said shafts and a supply table or support between the strikes substantially as set forth.

4. The mode of coating core barrels or spindles, or making cores herein described which consists in dividing the supply of coating or core material into two streams and directing each stream of material to a separate core barrel or spindle substantially as set forth.

5. The combination of two meshing or connected cores or core body shafts, strikes located between said shafts, and a feeding device interposed between said strikes, substantially as set forth.

6. The combination of two oppositely rotating core-body shafts, strikes for said body-shafts located between the latter, and a feed device interposed between the strikes substantially as set forth.

7. In a core making machine, the combination of revolubly supported parallel core-barrels, strikers between said core-barrels, a feed device interposed between said strikes and actuating mechanism for lowering and raising said feed device substantially as set forth.

8. In a machine for making cores, the combination of the parallel core-barrels F. G, the feeding device K intermediate of the core-barrels and adapted to be lowered and raised, and the vertically located strikes H H one at each side of the feeding device K between it and the adjacent core-barrel, substantially as set forth.

In testimony whereof I affix my signature in presence of two witnesses.

WILLIAM IRETON.

Witnesses:
GEORGE W. SELTZER,
AUGUSTUS H. BECKMANN.